US009667954B2

(12) United States Patent
Tang

(10) Patent No.: US 9,667,954 B2
(45) Date of Patent: May 30, 2017

(54) ENHANCED IMAGE DISPLAY IN HEAD-MOUNTED DISPLAYS

(75) Inventor: John G. Tang, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 1810 days.

(21) Appl. No.: 11/580,580

(22) Filed: Oct. 13, 2006

(65) Prior Publication Data

US 2008/0088529 A1   Apr. 17, 2008

(51) Int. Cl.
*H04N 15/00* (2006.01)
*H04N 13/04* (2006.01)
*G02B 27/01* (2006.01)
*G02B 6/00* (2006.01)

(52) U.S. Cl.
CPC ....... *H04N 13/044* (2013.01); *G02B 27/0172* (2013.01); *G02B 6/00* (2013.01); *G02B 2027/014* (2013.01); *G02B 2027/0112* (2013.01); *G02B 2027/0123* (2013.01); *G02B 2027/0178* (2013.01)

(58) Field of Classification Search
CPC .............. H04N 13/044; G02B 27/0172; G02B 2027/014; G02B 2027/0123; G02B 6/00; G02B 2027/0112; G02B 2027/0178
USPC .......................................................... 348/51
See application file for complete search history.

(56) References Cited

U.S. PATENT DOCUMENTS

| 5,488,508 A | 1/1996 | Haseltine |
| 5,579,026 A * | 11/1996 | Tabata ................................ 345/8 |
| 5,774,096 A * | 6/1998 | Usuki et al. ...................... 345/8 |
| 5,825,539 A | 10/1998 | Hoshi |
| 6,429,867 B1 * | 8/2002 | Deering ......................... 345/423 |
| 6,480,174 B1 | 11/2002 | Kaufmann et al. |
| 6,554,428 B2 * | 4/2003 | Fergason et al. ............. 351/211 |
| 6,822,770 B1 * | 11/2004 | Takeyama ....................... 359/13 |
| 2002/0113755 A1 * | 8/2002 | Lee .................................. 345/7 |

(Continued)

FOREIGN PATENT DOCUMENTS

| EP | 1 551 178 | 7/2005 |
| JP | 2004 007315 | 1/2004 |

(Continued)

OTHER PUBLICATIONS

International Search Report dated Nov. 18, 2008 in PCT Application No. PCT/US2007/081284.

(Continued)

*Primary Examiner* — John Macilwinen
(74) *Attorney, Agent, or Firm* — Kendall W. Abbasi

(57) ABSTRACT

Methods and apparatus, including computer program products, implementing and using techniques for projecting a source image in a head-mounted display apparatus having a left and a right display for projecting a left and right images viewable by the left and right eyes, respectively, of a user. Source image data is received. The source image has right, left, top, and bottom edges. The source image data is processed to generate left image data for the left display and right image data for the right display. The left image data includes the left edge, but not the right edge, of the source image and the right image data includes the right edge, but not the left edge, of the source image. The right image data is presented on the right display and the left image data is presented on the left display.

28 Claims, 7 Drawing Sheets

(56) References Cited

U.S. PATENT DOCUMENTS

| | | | |
|---|---|---|---|
| 2004/0174605 A1* | 9/2004 | Olsson | A61B 1/00048 359/630 |
| 2008/0062069 A1* | 3/2008 | Sinclair | G02B 27/017 345/8 |
| 2009/0175536 A1* | 7/2009 | Gutta et al. | 382/166 |

FOREIGN PATENT DOCUMENTS

| | | |
|---|---|---|
| JP | 2006 246511 | 9/2006 |
| WO | WO97/23094 | 6/1997 |
| WO | WO2005/041568 | 5/2005 |

OTHER PUBLICATIONS

Written Opinion dated Nov. 18, 2008 in PCT Application No. PCT/US2007/081284.
"The piSight™ Breakthrough", 2006, Sensics, http://www.sensics.com/products_breakthrough.html, 2 pgs.
"piSight™ SDK", 2006, Sensics, http://www.sensics.com/products_sdk.html, 1 pg.
"Specifications", 2006, Sensics, http://www.sensics.com/products_spefications.html, 2 pgs.
"piSight™", 2006, Sensics, http://www.sensies.com/products.html, 2 pgs.
Partial Search Report dated Jul. 3, 2008 in PCT Application No. PCT/US2007/081284.
Mon-Williams et al., "Binocular Virtual Reality Displays: When Problems Do and Don't Occur," Human Factrs, vol. 40, No. 1, Mar. 1998, pp. 42-49.
Peli et al., "A Binocular Stereoscopic Display System with Coupled Convergence and Accommodation Demands," SID 01 Digest, 2001.
Mon-Williams et al., "Gaze angle: a possible mechanism of visual stress in virtual reality headsets," Ergonomics, 1998, vol. 41, No. 3, 280-285.
Mon-Williams et al., "An Illusion that Avoids Focus," Proceedings: Biological Sciences, vol. 263, No. 1370, May 22, 1996, pp. 573-578.
Goldstein, "Scanpaths of motion sequences: Where people look when watching movies," submitted for publication in Computers in Biology and Medicine on Jul. 28, 2005.
Wong et al., "Stereoacuity at Distance and Near," Optometry and Vision Science, vol. 79, No. 12, Dec. 2002, pp. 771-778.
Wann et al., "Natural Problems for Stereoscopic Depth Perception in Virtual Environments," Vision Res., vol. 35, No. 19, 1995, pp. 2731-2736.
"Taiwanese Application Serial No. 096138510, Office Action mailed Aug. 29, 2013", (w/ English Translation), 16 pgs.
"International Application No. PCT/US2007/081284, International Preliminary Report on Patentability dated Apr. 15, 2009", 8 pgs.
"Taiwanese Application Serial No. 96138510, Office Action and Search Report mailed Nov. 20, 2012", (w/ English Translation), 16 pgs.
"Taiwanese Application Serial No. 96138510, Response filed Feb. 22, 2013 to Office Action mailed Nov. 20, 2012", (w/ English Translation of Amended Claims), 11 pgs.
"Taiwanese Application Serial No. 096138510, Office Action mailed Jan. 20, 2014", (w/ English Translation), 8 pgs.
"Taiwanese Application Serial No. 096138510, Office Action mailed Dec. 24, 2015", 5 pgs.

* cited by examiner

ENHANCED IMAGE DISPLAY IN HEAD-MOUNTED DISPLAYS

BACKGROUND

A head-mounted display (HMD) is a display device that a person wears on the head in order to have video information directly displayed in front of the eyes. HMDs are also known as near-to-eye displays. A HMD typically has either one or two small CRT, LCD or OLED displays with magnifying lenses and other associated optical elements. The display(s) and optics are typically embedded in a helmet, glasses, or a visor, which a user can wear. Lenses and other optical components are used to give the user the perception that the images are coming from a greater distance, which reduces eyestrain. In HMDs that use a single display, the image is typically projected through optics that split the image into two identical images, and redirects each image to the respective eye. With two displays, the HMD can show stereoscopic images. The stereoscopic images attempt to create depth to the images by simulating the angular difference between the images viewed by each eye when looking at an object, due to the different positions of the eyes. This angular difference is one of the key parameters the human brain uses in processing images to create depth perception or distance in human vision.

Some HMDs can be used to view a see-through image imposed upon a real world view, thereby creating what is typically referred to as an augmented reality. This is accomplished by reflecting the video images through partially reflective mirrors, such that the real world is seen through the mirrors' reflective surfaces. The augmented reality can be combined with the stereoscopic images in various types of applications. Some examples include applications in surgery, where radiographic data, such as CAT scans or MRI imaging can be combined with the surgeon's vision. Military, police and firefighters use HMDs to display relevant tactical information, such as maps or thermal imaging data. Engineers and scientists use HMDs to provide stereoscopic views of CAD schematics, simulations or remote sensing applications. Consumer devices are also available for use in gaming and entertainment applications.

FIGS. 1A-1D show some exemplary schematic views of different HMD display architectures. FIG. 1A shows an example of a transmissive HMD display architecture. In this architecture, a white light source, such as a white LED illuminates a liquid crystal display (LCD) that displays an image to a user. The image is then relayed to the user's eyes through an optical system, which can be either an aspherical or diffractive lens system. Such lens systems are well known to those of ordinary skill in the art and will also be discussed in further detail below.

FIG. 1B shows an example of an emissive HMD display architecture. In this architecture, the display is an Organic Light Emitting Diode (OLED) display, and thus a separate light source can be avoided. The image is then relayed to the user's eyes through an optical system, similar to the system described above with respect to FIG. 1A.

FIG. 1C shows an example of a reflective HMD display architecture. In this architecture, the display is a Liquid Crystal: on Silicon (LCoS) display. In LCoS, liquid crystals are applied to a reflective mirror substrate. A light source, such as a white or RGB LED directs light onto the LCoS display. As the liquid crystals in the display open and close, the light is either reflected from the mirror below, or blocked. This modulates the light and creates the image. The image is then relayed to the user's eyes through an optical system, similar to the system described above with respect to FIG. 1A.

FIG. 1D shows an example of a Micro-electro-mechanical (MEM)/Laser display architecture for a HMD. MEM devices are micro devices having electro-mechanical moving parts that are capable of constructively and destructively interfering with an incident light source to produce one or more optical signals. Optical MEM devices are typically fabricated from Silicon-based materials using lithographic techniques. Some optical MEM devices have reflective ribbons that are formed over a suitable substrate structure, such that the ribbons are spatially arranged in parallel and are coupled to the substrate structure. In use, a portion of the reflective ribbons are moved by applying an operating bias voltage, or switching voltage, across the ribbons and the substrate structure. By alternating, or switching, the potential of the bias voltage, the ribbons are alternated between the positions for constructive and destructive interference with the incident light source to generate optical signals. Other types of MEM devices use different types of movement, such as rotating, bending, or translating the reflective elements. As can be seen in FIG. 1D, the light source is a laser, and the resulting optical signals from the MEM devices are displayed on an image surface and viewed by the user.

Whereas the majority of these HMD configurations work well for their intended purposes, there is a continuing need for improved HMDs.

SUMMARY

This invention relates to processing and displaying images in a head-mounted display. According to one embodiment, the invention provides methods and apparatus for providing a wider field of view and creating a more natural viewing situation for a user of a head mounted display, which results in improved comfort and usability for head mounted displays. By using larger displays inside the HMDs and recreating each image displayed on each display as each eye would typically see it, a wider field of view and increased viewing comfort is achieved. Various embodiments of the invention allow users to customize different viewing parameters of the head mounted displays to accommodate for individual user variation in the users' eyes.

In general, in one aspect, the invention provides methods and apparatus, including computer program products, implementing and, using techniques for a head-mounted display apparatus for a user. The head-mounted display apparatus includes a left display, a right display and a processor. The left display projects a left image viewable by a left eye of the user, and the right display projects a right image viewable by a right eye of the user. The processor receives data representing a source image, which has a right edge, a left edge, a top edge, and a bottom edge. The processor processes the data representing the source image to generate left image data for the left display and right image data for the right display. The left image data includes the left edge but not the right edge of the source image and the right image data includes the right edge but not the left edge of the source image. The processor presents the right image data on the right display and present the left image data on the left display, and as a result a wider view is created that results in improved viewing comfort for the user.

Advantageous implementations can include one or more of the following features. The processor can receive data representing the source image from an external source. The external source can be a portable source and can include a memory in which the source image is stored. The head mounted display can include a memory in which the data representing the source image is stored, the memory being operatively coupled to the processor. Each of the left and right displays can provide a horizontal field of view for the user that is greater than about 30 degrees. Each of the left and right displays can have an aspect ratio of 16/9. Data representing the source image, the right image data, and the left image data, can be movie data. Each of the left and right image data can include a centerline of the source image. The centerline of the source image can be displayed to the right of a centerline on the left display, and the centerline of the source image is displayed to the left of a centerline of the right display. One or more light sources can be located in close proximity to a perimeter of each of the right and left displays to dynamically show colors matching the colors that are displayed on the right and left displays, respectively, so as to enhance the viewing experience. A user interface can be provided that includes one or more controls for providing instructions from the user to the processor about what portion of the source image to include in the generation of the right image data and the left image data, respectively.

Embodiments of the invention can be implemented to include one or more of the following advantages. One advantage is that the translation of a right image to the right and a left image to the left provides a wider field of view and increased viewing comfort compared to conventional HMDs. Another advantage is that users can make individual adjustments of their HMDs to fit the distance between their eyes, and so on. As a result of having two images that are slightly translated in the horizontal plane with respect to each other, stereoscope-like effects may also be achieved, which further increases the viewing comfort of the user, and enhances the user's experience.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1A:
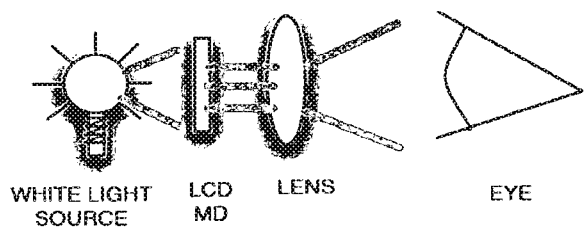
FIGS. 1A-1D schematically show some exemplary display configurations in HMDs.

The invention will be described in detail with reference to specific implementations including the best modes contemplated by the inventors for carrying out the invention. Examples of these specific implementations are illustrated in the accompanying drawings. While the invention is described in conjunction with these specific implementations, it will be understood that this description is not intended to limit the invention to the described implementations. On the contrary, the description is intended to cover alternatives, modifications, and equivalents as may be included within the spirit and scope of the invention. In the following description, specific details are set forth in order to provide a thorough understanding of the present invention. The present invention can be practiced without some or all of these specific details. In addition, well-known features or details may not have been described to avoid unnecessarily obscuring the invention. In order to fully appreciate the properties of the various embodiments of the invention, some concepts relating to the human vision and image science research will be explained.

Field of View (FOV):

The field of view for an image describes the angular extent of the image, that is, the amount of a given scene that is viewable in the image. The human eye has a 180-degree field of view, and typically the images projected on displays in HMDs only show a much smaller field of view. This is largely due to the limitations of the lenses and display technology that are used to record the image. Various embodiments of the present invention, as will be described below, provide mechanisms for maximizing the FOV for the images, to make it as close the FOV of the human eye as possible.

Eye Motion Box (EMB):

The eye motion box represents the area in which the user's eye can move without loss of the full FOV. Having a sufficiently large EMB is one of the most significant parameters relating to the viewing comfort of the user. A typical EMB is about a 10-15 millimeter square.

Image Focal Plane:

The plane is where an image is focused. Typically, having an image focal plane located far away is more comfortable, since it minimizes the strain on the accommodation muscles in the eyes. Strain on these muscles is thought to be related to myopia, that is, near-sighted vision.

Eye Relief:

The eye relief is the offset of the nearest optical surface from the eye. The optimal eye relief distance, is typically considered to be the distance at which the exit pupil is approximately the same size as the eye's pupil. The optimal eye relief distance is usually in the range of about 18-30 mm. Using an exit pupil smaller than the observer's pupil may force the user to press his or her eye close to the eyepiece in order to see an unvignetted image. Alternatively, using an exit pupil larger than the observer's pupil at a comfortable viewing position, results in wastage of light and a dimmer than optimum image.

Peripheral Vision:

Peripheral vision is a part of vision outside the very center of gaze. There is in actuality a very broad set of non-central points in the field of view that is included in the notion of peripheral vision. "Far peripheral" vision exists at the edges of the field of view, "mid-perpheral" vision exists in the middle of the field of view, and "near-peripheral", sometimes referred to as "paracentral" vision, exists adjacent to the center of gaze. Peripheral vision is good at detecting motion and as a result, occluded peripheral vision in HMDs can cause a user to experience motion sickness symptoms.

Figure 2:
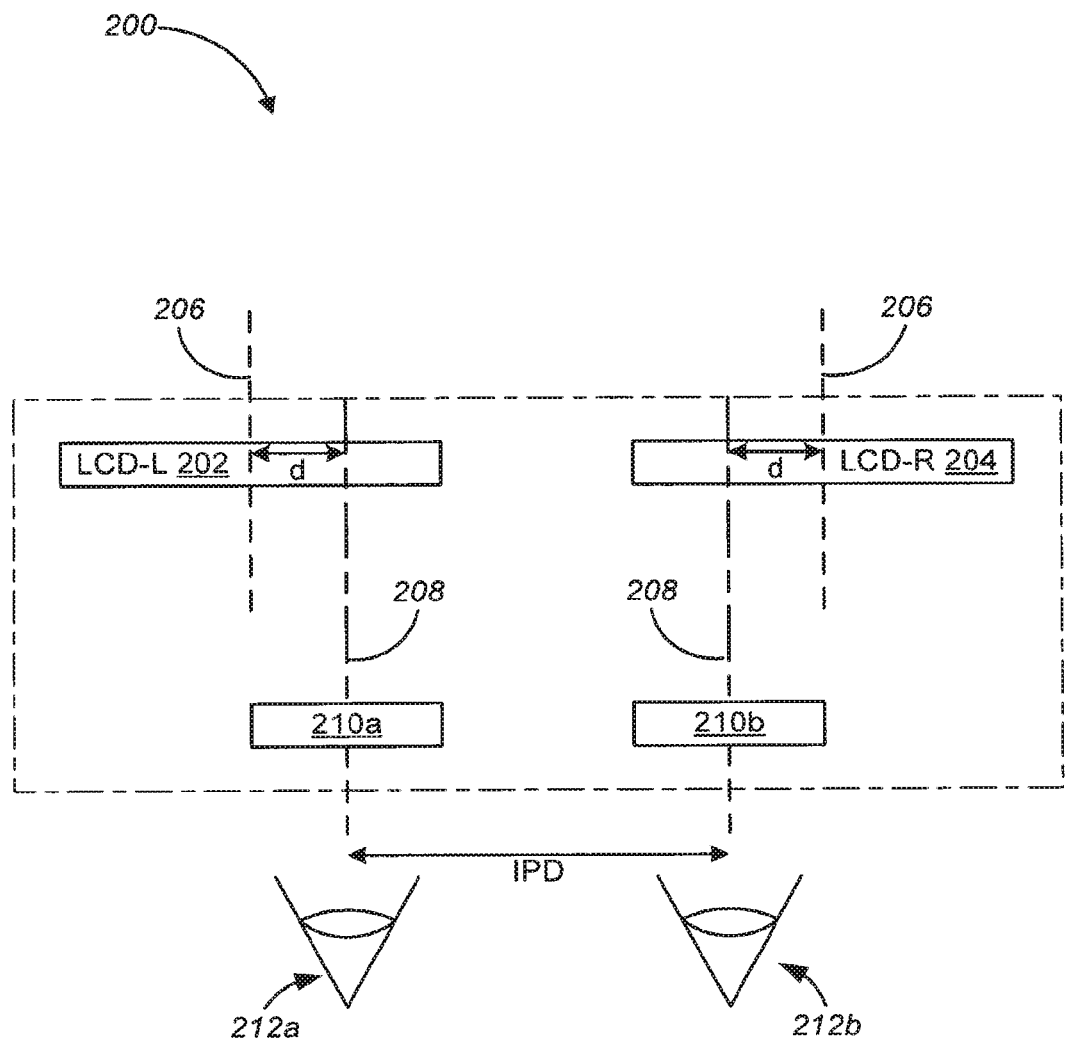
FIG. 2 shows a schematic view of the placement of the displays relative to the user's eyes in a HMD with two displays in accordance with one embodiment of the invention.

A particularly useful application for the HMDs in accordance with various embodiments of the invention lies within the entertainment field, namely viewing movies. FIG. 2 shows a schematic view of a HMD (200) in accordance with one embodiment of the invention. As can be seen in FIG. 2, the HMD (200) has two displays (202; 204) that are situated such that a centerline (206) of each display (202; 204) is offset with a distance d, typically about 0-4 millimeters, from a centerline (208) of the user's eyes (212a; 212b). This allows the displays (202; 204) to cover more of the periphery of the user's field of vision. As is shown in FIG. 2, preferably, the centerline (206) of the left display (202) is located a distance d to the left of the centerline (208) of the user's left eye (212a), and the centerline (208) of the right display (204) is located a distance d to the right of the centerline (208) of the user's right eye (212b). Optical components (210a; 210b) focus the images from the respective displays (202; 204) onto the user's eyes (212a; 212b) at a comfortable viewing distance. However, placing the displays (202; 204) off center without performing any additional image manipulation will confuse the brain of the user, as each eye is looking at a different portion of the image when the user looks straight ahead, and the brain is expecting to see essentially the same image with each eye. Therefore, the centerlines of the respective images shown on the left and right displays (202; 204) should be matched or almost matched with the centerline (208) of the user's eyes (212a; 212b). How this is done will now be described with reference to FIG. 3, which shows a schematic view of an image generation system (300) in the HMD, and to FIG. 4, which shows a flowchart for the processing and display of an incoming video signal.

Figure 3:
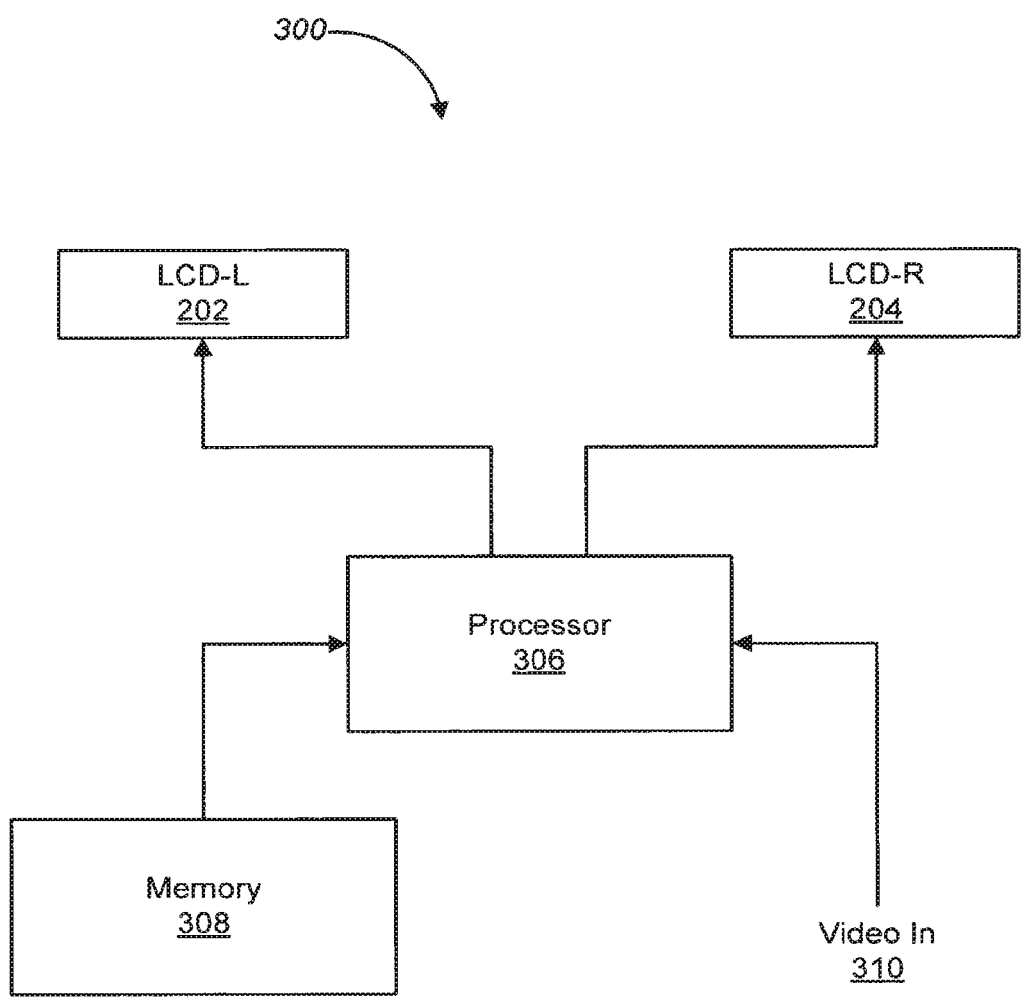
FIG. 3 shows a schematic view of a HMD image generation system (300) in accordance with one embodiment of the invention.

As can be seen in FIG. 3, the system image generation system (300) includes the left display (202) and the right display (204), a processor (306), and a memory (308). The processor (306) is connected to the memory (308), which contains instructions for how to process image frames contained in an incoming video signal (310), which represents a movie to be displayed in the HMD.

Figure 4:
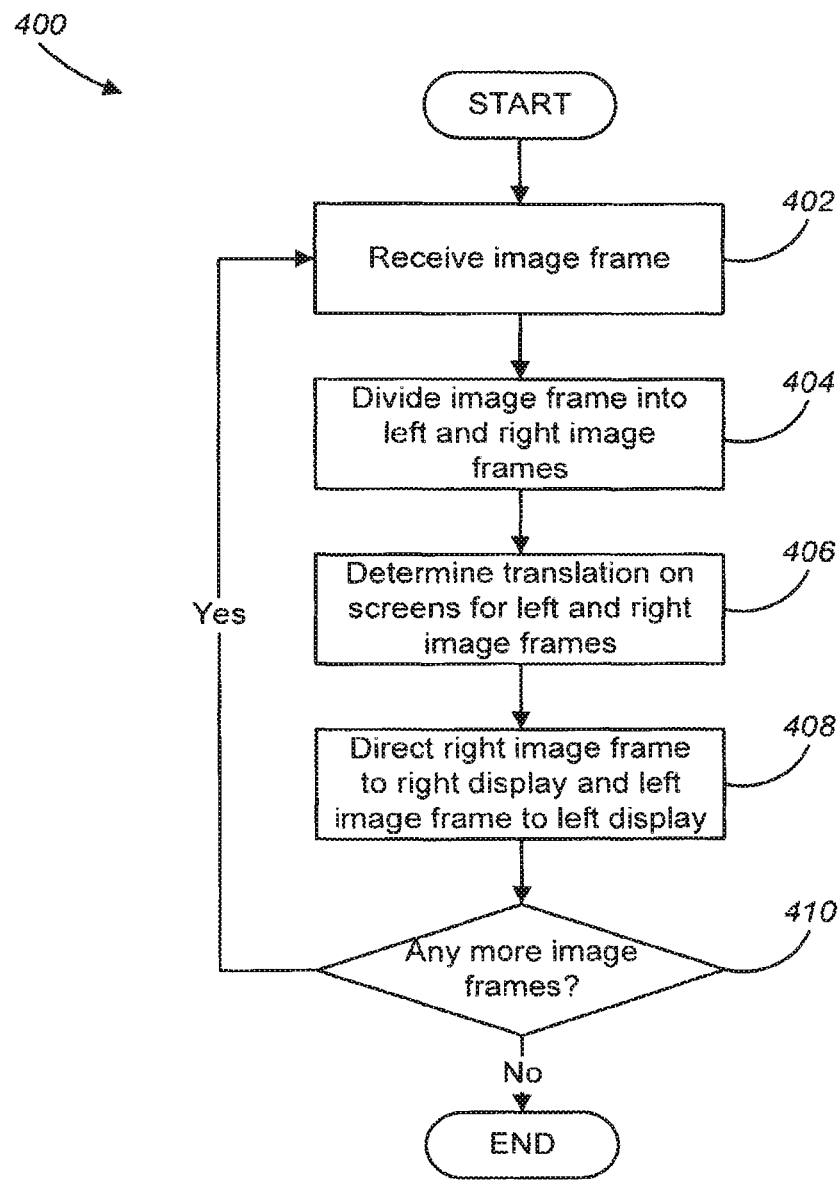
FIG. 4 shows a flowchart of a process for displaying two horizontally offset images in a HMD in accordance with one embodiment of the invention.

As can be seen in FIG. 4, the process (400) for displaying the two offset images starts by the processor (306) receiving an image frame of the movie (step 402), shown as "Video In" (310) in FIG. 3. The image frame can be received from an external video source, such as a portable video player connected to the HMD, or even through a wireless connection to some external video source. Alternatively, the memory (308) in the HMD can contain one or more previously downloaded videos that can be accessed by the processor (306) in the same way that a video from an external source is accessed.

The processor (306) then divides the received image frame into a left image to be displayed on the left display (202) and a right image to be displayed on the right display (204) (step 404). In one embodiment this is done, for example, by duplicating the incoming image frame into two image frames—one for the left display (202) and one for the right display (204).

Next, the processor (306) determines a horizontal translation is determined for each of the right and left images (step 406). This horizontal translation is illustrated in FIG. 2 as the distance d between the centerlines (206) of the respective displays (202; 204) and the centerlines (208) of the image frame. In the embodiment shown in FIG. 2, the distance d is the same for both the left display (202) and the right display (204), but it should be noted that individual translations can be determined for each display using the same techniques. In determining the amount of translation d, the processor (306) uses software instructions that are stored in the memory (308). As is well known by those of ordinary skill in the art, there are many software programs that can control where to display an image or movie on a display. Some examples include Final Cut Pro®, available from Apple Computer Inc. of Cupertino, Calif., and Adobe® Premiere®, available from Adobe Systems of San Jose, Calif.

Some embodiments take the user's interpupillary distance (IPD) into account in calculating the of translation d for the right and left image frames. For example, the user can either input a numerical value representative of his IPD, if it is known. Alternatively two sample images can be displayed to the user, and the user can dynamically change the horizontal translation of the pictures by moving a dial, or some other control, until a comfortable viewing configuration is obtained. Similar techniques can also be used to make adjustments based on the user's peripheral vision, since the peripheral vision typically varies from user to user.

After determining the translation amount d, the processor (306) directs the left image frame to the left display (202) and the right image frame to the right display (204) in the HMD (step 408). The process then determines whether there are any more image frames to be displayed (step 410). If there are additional image frames, the process returns to step 402, and if there are no more image frames, then the process ends.

As was discussed above, there are a wide variety of display architectures that can be used in HMDs. The principles discussed above with respect to FIGS. 3 and 4 can be applied to any of these architectures. Each of these architectures comes with its particular advantages and drawbacks. For example, the LCD microdisplays shown in FIG. 1A have high brightness, good color saturation, good image sharpness and have a low manufacturing cost, but they also exhibit so-called "screen door effects." Screen door effects occur when the display is enlarged to the point that the user's eyes can distinguish the individual pixels and thus a grid pattern in the image on the display. LCD microdisplays also suffer from inherent size limitations in that the manufacturing yield is lower as the displays get larger, and thus the cost of the displays increases.

Figure 1B:
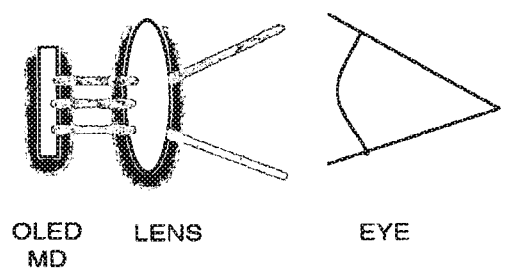

The OLED microdisplays shown in FIG. 1B exhibit low power consumption, require simple optics, have high contrast ratio, and have a low manufacturing cost, but they have limited lifetime and their brightness decreases over time. They may also have potential problems with resolution and pixel consistency.

Figure 1C:
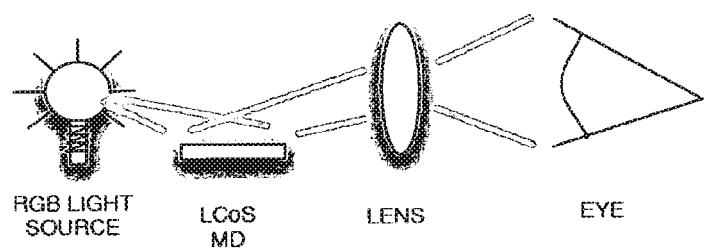

The LCoS microdisplays shown in FIG. 1C have a high pixel density and contrast, fast response time, IC compatibility and are experiencing an increasing application in rear projection TVs (RPTVs). On the other hand, there are currently some concerns about their lifetime, they suffer from color break ups that create "rainbow effects." LCoS displays use what is typically referred to as field sequential color lighting. That is, the pixels in the LCoS display turn on and off in order to reflect or not to reflect light. Thus, in order to get an image, red, green and blue colors are sequentially flashed onto the LCoS panel. The LCoS panel is coordinated with this and creates the image by having the appropriate pixels turn on or off. The three color sequence happens so fast that the user's eyes cannot distinguish the individual colors during normal viewing. However, if the user moves his eyes across the image quickly, this effect is visible as a rainbow, thus the name rainbow effect. In addition, LCoS displays also require more complex optics and the color saturation is poor.

Figure 1D:
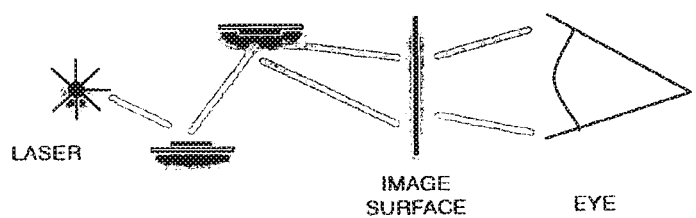

The MEM/laser system shown in FIG. 1D provides infinite focus, the widest color gamut among these systems, and is relatively small. On the other hand, it requires fast modulating lasers, and there may be power consumption and/or safety issues, depending on how the HMD is being used by the user.

What is true for all displays used in the various HMD embodiments in accordance with the invention, however, is that they are generally larger than the displays that are used in today's conventional HMDs. Typically the size of the displays in various embodiments of the invention is larger than about 0.7 inches diagonally across the display. The effect of having larger displays compared to conventional HMDs is that the image fills the entire field of view for the user and make use of the user's peripheral vision, similar to what the user experiences in a Imax or Omnimax movie theatres. Another side effect of translating the images is that a stereoscope-like effect is obtained, in which the user perceives the images as having greater depth than what is currently possible in conventional HMDs.

The displays can also have different aspect ratios depending on the primary application of the HMD. For example, an aspect ratio of 4×3, i.e., similar to a television screen, may be desirable by a user who primarily is interested in using the HMDs to watch television programs, whereas an aspect ratio of 16×9, i.e., similar to a movie theatre screen, may be desirable by a user who primarily is interested in watching feature films.

The above discussion has been focused on the image generation system and the displays of the HMD. Another important component of the HMD is the optics (210a; 210b), which actually transforms the image on the displays into an image that can be viewed by the human eye. A brief overview of various optical arrangements that can be used in accordance with various embodiments of the invention will now be described.

Figure 5A:
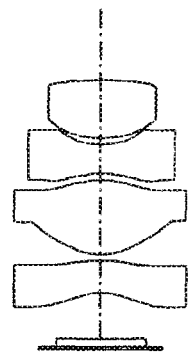
FIGS. 5A-5C show some schematic views of aspherical optical arrangements for use in a HMD in accordance with one embodiment of the invention.
Figure 5B:
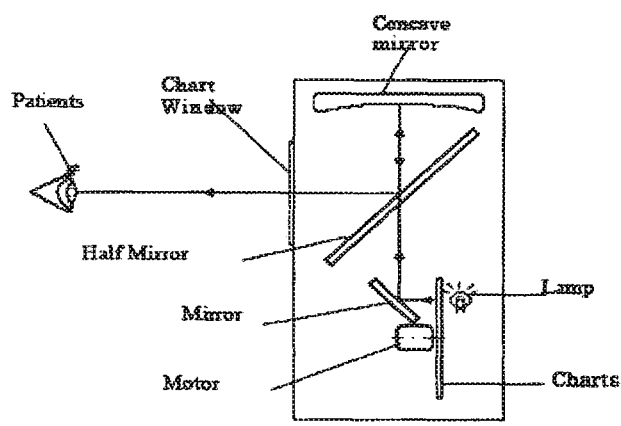
Figure 5C:
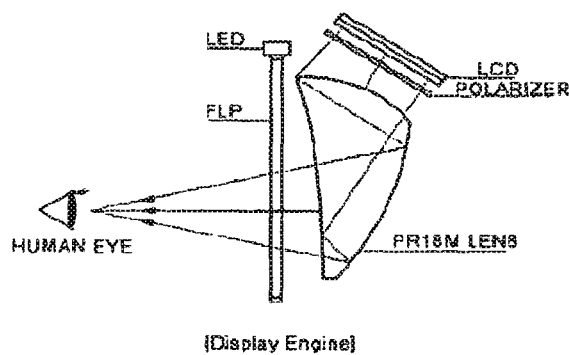

Aspherical optical arrangements include various types of prism and/or lens arrangements. FIGS. 5A-5C show some examples of aspherical optical arrangements that can be used in HMDs in accordance with various embodiments of the invention. FIG. 5A shows a coaxial arrangement of a set of lenses arranged along a common axis. The lenses bend the incoming light to create a virtual image at a comfortable viewing distance for the user. The coaxial arrangement is simple and low cost, but may be bulky and have problems with spherical aberrations, and provide a small eye motion box. FIG. 5B shows a concave mirror arrangement, which also create a virtual image, but also folds the optical path. The concave mirror arrangement is a simple and low cost arrangement, but it requires a fair amount of space and the alignment between the elements is critical for the arrangement to work properly. FIG. 5C shows a free shaped prism arrangement, in which the image from the display is redirected and magnified. This arrangement provides a large field of view and is compatible with a wide variety of display devices, although it may be somewhat more bulky than other optical arrangements described herein.

Figure 6A:
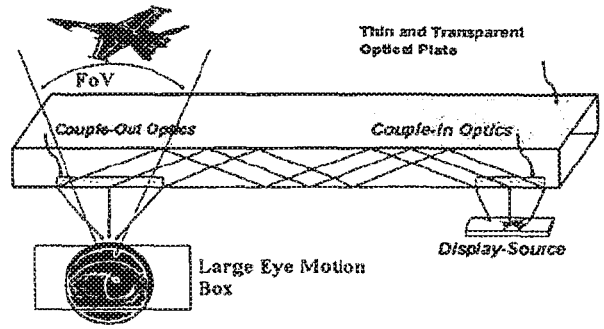
FIGS. 6A-6C show some schematic views of diffractive optical arrangements for use in a HMD in accordance with one embodiment of the invention.
Figure 6B:
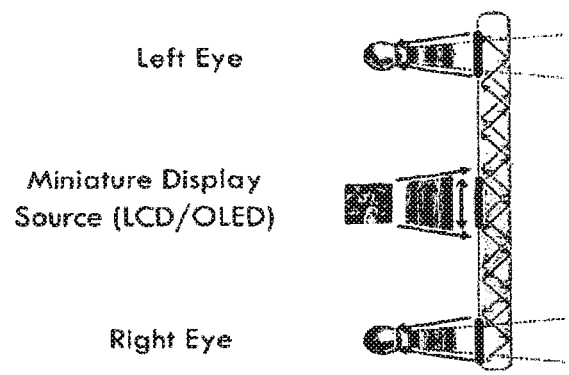
Figure 6C:
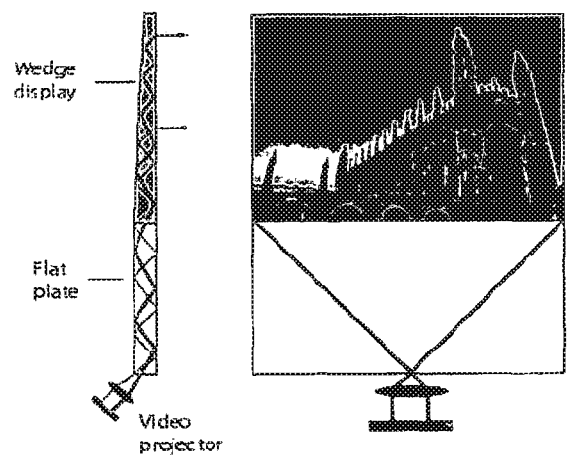

Diffractive optical arrangements include various types of arrangements that bend and spread light. FIGS. 6A-6C show some examples of diffractive optical arrangements that can be used in HMDs in accordance with various embodiments of the invention. FIG. 6A shows a light-guided optical element (LOE), which can be made of planar transparent glass or plastic. The LOE configuration increases the eye motion box for a given image and can be made as thin as about 2 mm. The LOE is see-through capable and provides a large field of view (up to about 40 degrees), and can also be encapsulated into a larger lens, if need be. The LOE can be used together with LCD and LCoS displays.

FIG. 6B shows a binocular light-guided optical element (BLOE), which can be made of planar transparent glass or plastic. In the BLOE configuration, a centered input image is directed to binocular images. It is important that the left and right images are properly aligned in order not to cause physical distress for the user. Just like the LOE in FIG. 6A, the BLOE can be made thin, typically about 3 mm thickness, and is see-through capable. It can be used together with LCD and OLED displays.

FIG. 6C shows a wedge display. The image enters the edge of the wedge optics, and travels through an expansion region before it is displayed to the user's eye. Its thickness can be as small as about 2 mm, and its size can be very large—up to 50-inch prototypes have been manufactured to date. It is also possible to use in a folded design, which may save space compared to other optical arrangements, and it accepts a wide variety of display types.

Figure 7:
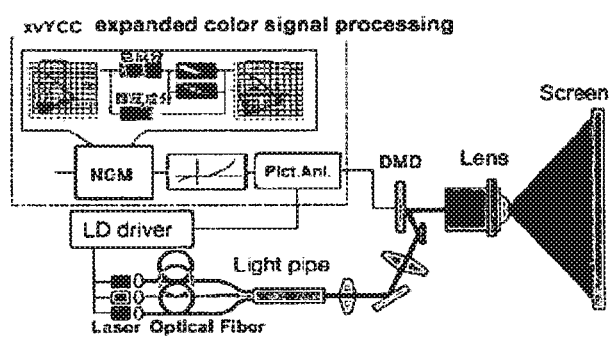
FIG. 7 shows a schematic view of a laser system thai can be used with HMDs in accordance, with, various embodiments of the invention.

FIG. 7 shows a schematic view of a MEM/Laser System that can be used in HMDs in accordance with various embodiments of the invention. The Mem/Laser system uses red, green and blue lasers with a single or dual MEM device to generate raster-scanned images. At present, the horizontal scanning rate is about 31 kHz and the vertical scanning rate is in the range of about 0-400 Hz. Of course, these parameter will change as new types of MEM elements and lasers become available. One advantage of MEM/Laser systems is that they have an infinite focal distance. As a result, one can create an image on a flat surface at any distance, and the image will be in focus. A limitation of the system is that as the surface is further away, the image gets dimmer.

The various embodiments described above have been focused on configurations using two displays. However, it is also possible to use a single display, provided that the display is sufficiently large (or can be modified by the optics to appear that way) that it fills the entire field of view for the user. Alternatively, a smaller single display can be used, and optics can be provided that splits this single image into a right image and a left image to be displayed in front of each eye of the user at sufficient magnification. As the skilled person in the art realizes, in these situations, there is no need for the processor to manipulate the display image from the source, as was described above with respect to FIGS. 3 and 4. The actual horizontal translation of the image occurs in the optics that split the image into two separate images. It should also be noted that the above described principles can also be implemented in HMDs that use more than two displays. In such implementations, the amount of translation for an image shown on a particular display would be calculated based on the physical location of the display relative to the other displays in the HMD.

In some alternative embodiments, the images are not horizontally translated by the processor (306), but instead sufficiently large displays are provided so that the field of view for each eye is filled and the limitations as to what the user can view is determined by his or her physical constraints. That is, the user's eyes rather than the display sizes limit the field of view. Alternatively, this can also be achieved by changing the optics associated with the display, such that the image is magnified more than in today's HMDs and give the user the appearance of looking at a large display.

In some embodiments, the periphery of the displays can be additionally equipped with light sources that dynamically project light that matches the images that are shown on the displays. This configuration can further enhance the user's viewing experience, since it uses more of the user's peripheral vision. Such a configuration is described in the co-pending U.S. patent application Ser. No. 11/580,774 entitled "Peripheral Treatment for Head Mounted Displays," filed concurrently herewith, which is hereby incorporated by reference in its entirety.

In some embodiments, the HMDs described above can also be equipped with an audio system, such as a set of headphones or some other type of audio device. This will allow the users to watch feature movies and/or documentaries essentially anywhere and without having to worry about conventional issues, such as screen glare, and so on. Furthermore, the user experience in viewing movies using HMDs in accordance with various embodiments of the invention can be as good, or even better, than what a user experiences in a movie theatre.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

A number of implementations of the invention have been described. Nevertheless, it will be understood that various modifications may be made without departing from the spirit and scope of the invention. Accordingly, other embodiments are within the scope of the following claims.

The invention claimed is:

1. A head-mounted display apparatus, comprising:
a left display operable to project a left image for a left eye view perspective, wherein a centerline of the left display is offset externally from the centerline of the left eye view perspective;
a right display operable to project a right image for a right eye view perspective, wherein a centerline of the right display is offset externally from the centerline of the right eye view perspective; and
a processor operable to:
receive data representing a source image, the source image having a right edge, a left edge, a top edge, and a bottom edge;
receive an input corresponding to an interpupillary distance between the right eye view perspective and the left eye view perspective;
determine respective horizontal translations for a left image and a right image, based on the received input, the centerline of each of the left display and the right display, and an image centerline of each of the left image and the right image;
process the data representing the source image, based on at least the respective horizontal translations, to generate left image data for the left display and right image data for the right display, wherein the left image data includes the left edge but not the right edge of the source image and the right image data includes the right edge but not the left edge of the source image; and present the right image data on the right display and present the left image data on the left display wherein the right image data and the left image data are each independently adjustable horizontally in accordance with the interpupillary distance between the right eye view perspective and the left eye view perspective.

2. The head-mounted display apparatus of claim 1, wherein the processor is operable to receive data representing the source image from an external source.

3. The head-mounted display apparatus of claim 2, wherein the external source is a portable source and includes a memory in which the source image is stored.

4. The head-mounted display apparatus of claim 1, further comprising:
a memory in which the data representing the source image is stored, the memory being operatively coupled to the processor.

5. The head-mounted display apparatus of claim 1, wherein each of the left and right displays provide a horizontal field of view that is greater than 30 degrees.

6. The head-mounted display apparatus of claim 1, wherein each of the left and right displays has an aspect ratio of 16/9.

7. The head-mounted display apparatus of claim 1, wherein the data representing the source image, the right image data, and the left image data, are movie data.

8. The head-mounted display apparatus of claim 1, wherein:
the image centerline of the left image is displayed to the right of the centerline on the left display, and
the image centerline of the right image is displayed to the left of the centerline of the right display.

9. The head-mounted display apparatus of claim 1, further comprising:
one or more light sources located in proximity to a perimeter of each of the right and left displays, the light sources being operable to dynamically show colors matching the colors that are displayed on the right and left displays.

10. The head-mounted display apparatus of claim 1, further comprising:
a user interface including one or more controls for providing instructions to the processor about what portion of the source image to include in the generation of the right image data and the left image data, respectively.

11. The head-mounted display apparatus of claim 10, wherein the user interface is configured to receive a numerical value representative of the interpupillary distance between the right eye view perspective and the left eye view perspective.

12. The head-mounted display apparatus of claim 10, wherein the user interface is configured to display two sample images, provide a control that dynamically changes a horizontal separation between the sample images, and receive from the control a value representative of the interpupillary distance between the right eye view perspective and the left eye view perspective.

13. A computer-implemented method for projecting a source image in a head-mounted display apparatus, the head-mounted display apparatus having a left display operable to project a left image for a left eye view perspective and a right display operable to project a right image for a right eye view perspective, the method comprising:

receiving data representing a source image, the source image having a right edge, a left edge, a top edge, and a bottom edge;

receiving an input corresponding to an interpupillary distance between the right eye view perspective and the left eye view perspective;

determining a first display centerline for the left display and a second display centerline for the right display, wherein the first display centerline is offset externally from an expected centerline of the left eye view perspective, and wherein the second display centerline is offset externally from an expected centerline of the right eye view perspective;

determining respective horizontal translations for a left image and a right image, based on the received input, the first display centerline, the second display centerline, and an image centerline of each of the left image and the right image;

processing the data representing the source image, based on at least the respective horizontal translations, to generate left image data for the left display and right image data for the right display, wherein the left image data includes the left edge but not the right edge of the source image and the right image data includes the right edge but not the left edge of the source image; and presenting the right image data on the right display and presenting the left image data on the left display wherein the right image data and the left image data are each independently adjustable horizontally in accordance with the interpupillary distance between the right eye view perspective and the left eye view perspective.

14. The method of claim 13, wherein receiving data includes receiving data representing the source image from an external source.

15. The method of claim 14, wherein the external source is a portable source and includes a memory in which the source image is stored.

16. The method of claim 13, wherein receiving data includes:
receiving data from a memory located inside the head-mounted display apparatus, in which memory the data representing the source image is stored.

17. The method of claim 13, wherein the data representing the source image, the right image data, and the left image data, are movie data.

18. The method of claim 13, wherein directing the right image data to the right display and direct the left image data to the left display includes:
directing the left image data such that the image centerline of the source image is displayed to the right of a centerline on the left display, and
directing the right image data such that the image centerline of the source image is displayed to the left of a centerline on the right display.

19. The method of claim 13, further comprising:
providing one or more light sources in proximity to a perimeter of each of the right and left displays; and
dynamically show colors with the light sources that match the colors being displayed on the right and left displays.

20. The method of claim 13, further comprising:
receiving instructions at processor about what portion of the source image to include in the generation of the right image data and the left image data, respectively.

21. A non-transitory computer program product, stored on a machine-readable medium, comprising instructions operable to cause a processor coupled to a head-mounted display to:

receive data representing a source image, the source image having a right edge, a left edge, a top edge, and a bottom edge;

receive an input corresponding to an interpupillary distance between a right eye view perspective and a left eye view perspective;

determine a first display centerline for a left display and a second display centerline for a right display, wherein the first display centerline is offset externally from an expected centerline of the left eye view perspective, and wherein the second display centerline is offset externally from an expected centerline of the right eye view perspective;

determine respective horizontal translations for a left image and a right image, based on the received input, the first display centerline, the second display centerline, and an image centerline of each of the left image and the right image;

process the data representing the source image, based on at least the respective horizontal translations, to generate left image data for the left display and right image data for the right display in a head-mounted display apparatus, wherein the left image data includes the left edge but not the right edge of the source image and the right image data includes the right edge but not the left edge of the source image; and present the right image data on the right display and present the left image data on the left display wherein the right image data and the left image data are each independently adjustable horizontally in accordance with the interpupillary distance between the right eye view perspective and the left eye view perspective.

22. The computer program product of claim 21, wherein the instructions to receive data include instructions to receive data representing the source image from an external source.

23. The computer program product of claim 22, wherein the external source is a portable source and includes a memory in which the source image is stored.

24. The computer program product of claim 21, wherein the instructions to receive data include instructions to:

receive data from a memory located inside the head-mounted display apparatus, in which memory the data representing the source image is stored.

25. The computer program product of claim 21, wherein the data representing the source image, the right image data, and the left image data, are movie data.

26. The computer program product of claim 21, wherein the instructions to direct the right image data to the right display and direct the left image data to the left display include instructions to:

direct the left image data such that a source centerline of the source image is displayed to the right of a centerline on the left display, and direct the right image data such that a source centerline of the source image is displayed to the left of a centerline on the right display.

27. The computer program product of claim 21, further comprising instructions to:

provide one or more light sources in proximity to a perimeter of each of the right and left displays; and dynamically show colors with the light sources that match the colors being displayed on the right and left displays.

28. The computer program product of claim 21, further comprising instructions to:

receive instructions at the processor about what portion of the source image to include in the generation of the right image data and the left image data, respectively.

* * * * *